May 21, 1940. C. DOERING ET AL 2,201,392
CONTINUOUS CUTTING MACHINE FOR PLASTIC MATERIAL
Filed May 9, 1938 3 Sheets-Sheet 3

Inventors.
Charles Doering,
Henry H. Doering,
Eric W. Anderson,
Bertil Skoglund.
By George Heideman
Attorney Patented May 21, 1940

2,201,392

UNITED STATES PATENT OFFICE 2,201,392

CONTINUOUS CUTTING MACHINE FOR PLASTIC MATERIAL

Charles Doering, Henry H. Doering, Eric W. Anderson, and Bertil Skoglund, Chicago, Ill.; said Anderson and said Skoglund assignors to said Charles Doering and said Henry H. Doering Application May 9, 1938, Serial No. 206,854

16 Claims. (Cl. 31—20)

Our invention pertains to a cutting machine which is continuous in operation for automatically cutting plastic material such as butter, cheese, and the like, which has previously been formed into a suitable ribbon and arranged to be delivered onto an endless conveyor which constitutes a part of our improved machine and which conveyor is adapted to travel at a prearranged speed commensurate with the speed of the endless cutting mechanism arranged thereabove, whereby uniformity in cut portions or prints will be obtained.

The objects and advantages of our invention will be readily comprehended from the detailed description of the accompanying drawings, wherein—

Figure 1:
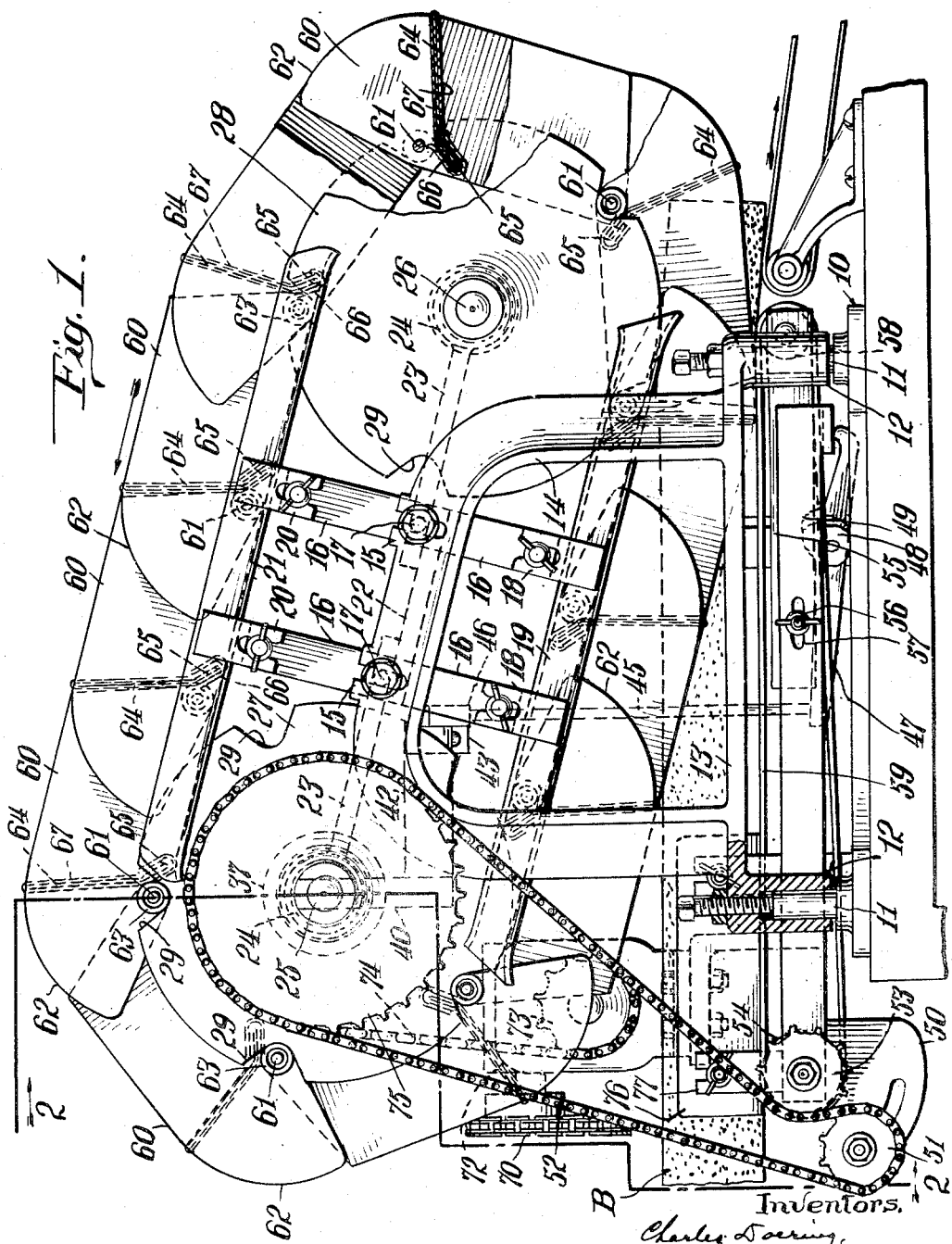
Figure 1 is a side elevation of our improved machine with certain portions in section to more clearly disclose the construction.

The particular exemplification of the invention comprises a suitable base frame 10 provided at suitable points with upstanding posts 11 which receive the sleeve elements 12, of the upper or cutter mechanism carrying frames 13, 13 (one at each side of the machine), which, in turn, are provided with the vertically disposed arch-like frames 14 (one on each side of the machine) which provide support for the main elements of the machine; the tops of the arch-like frames 14 being arranged at an inclination, namely sloping downwardly toward the delivery end of the machine.

The top portions of the arch-like frames 14, 14 are each provided with a pair of upstanding lugs 15, 15, slotted vertically as shown in Figure 1, for the purpose of adjustably securing the spacer or supporting bars 16, 16 in place by means of bolts 17.

The lower ends of the bars 16, each have an arm 18, bolted thereto; the arms 18 extending upwardly from the slopingly arranged channel member or guide rails 19; the guide rails 19 (one on each side of the machine) being in the nature of channel bars with the channeled side disposed inwardly.

The upper ends of the bars 16 have the depending arms 20, 20 of a sloping angle-bar or guide rail 21; the angle-side being disposed inwardly.

The channel members or guide rails 19 and the guide rails 21 are spaced apart a predetermined distance commensurate with the number of cutting elements used and arranged substantially parallel with each other to properly support and guide the trunnions of the cutter mechanism later to be described.

Figure 3:
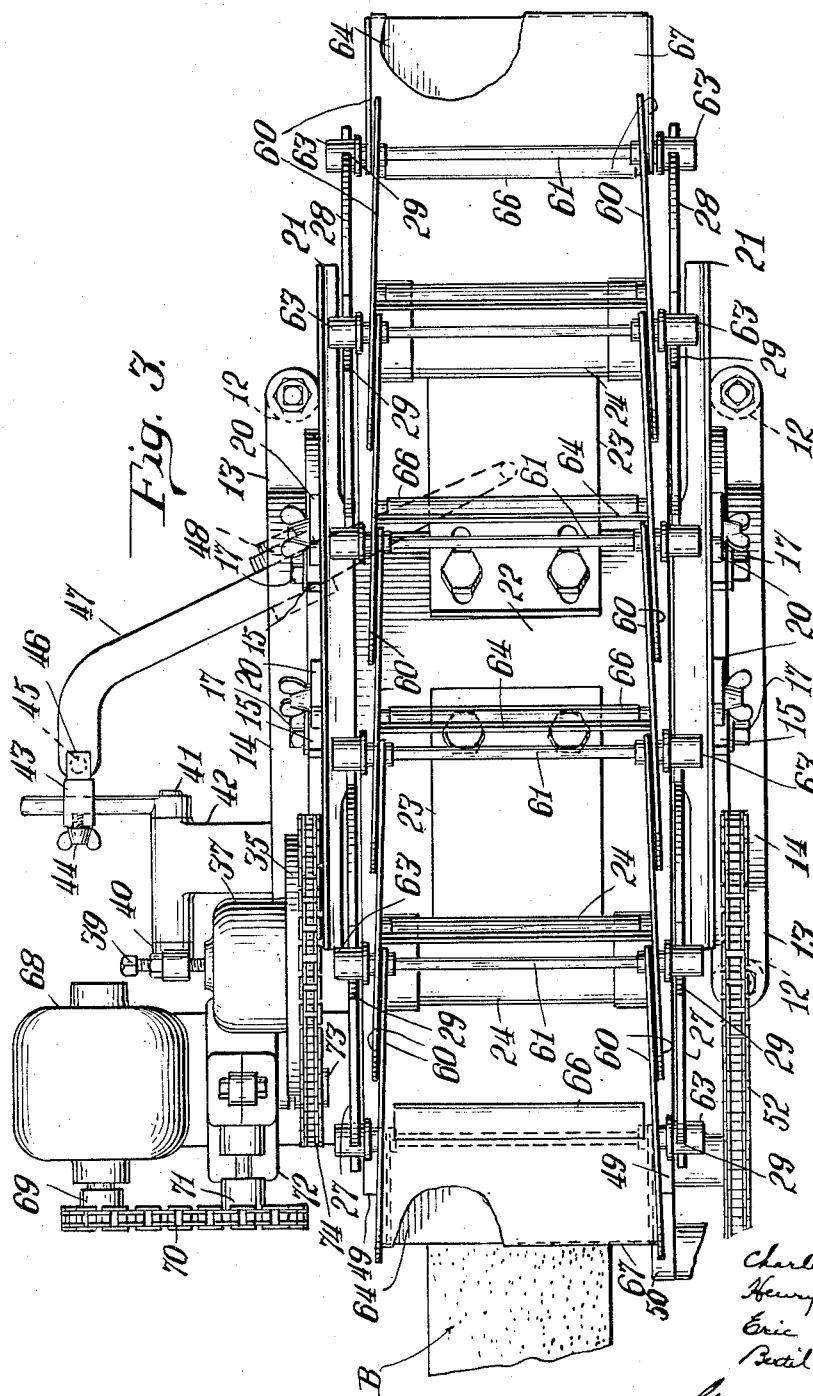
Figure 3 is a top plan view of the machine.

The bars 16, intermediate of their ends, have a plate 22 secured thereto; the plate extending transversely of the machine as shown in Figure 3. This cross piece or plate 22 provides support for the bearing plates or members 23, 23 (see Figure 3) whose outer ends terminate in bearing sleeves 24 which support the axles 25, 26 of the cutter mechanism controlling wheels or discs 27, 28, whose perimeters are provided with notches or recesses 29 of predetermined number and circumferential spacing; each of the discs or wheels 27, 28, at both sides of the machine as exemplified in the drawings being shown with five notches or recesses 29.

Figure 2:
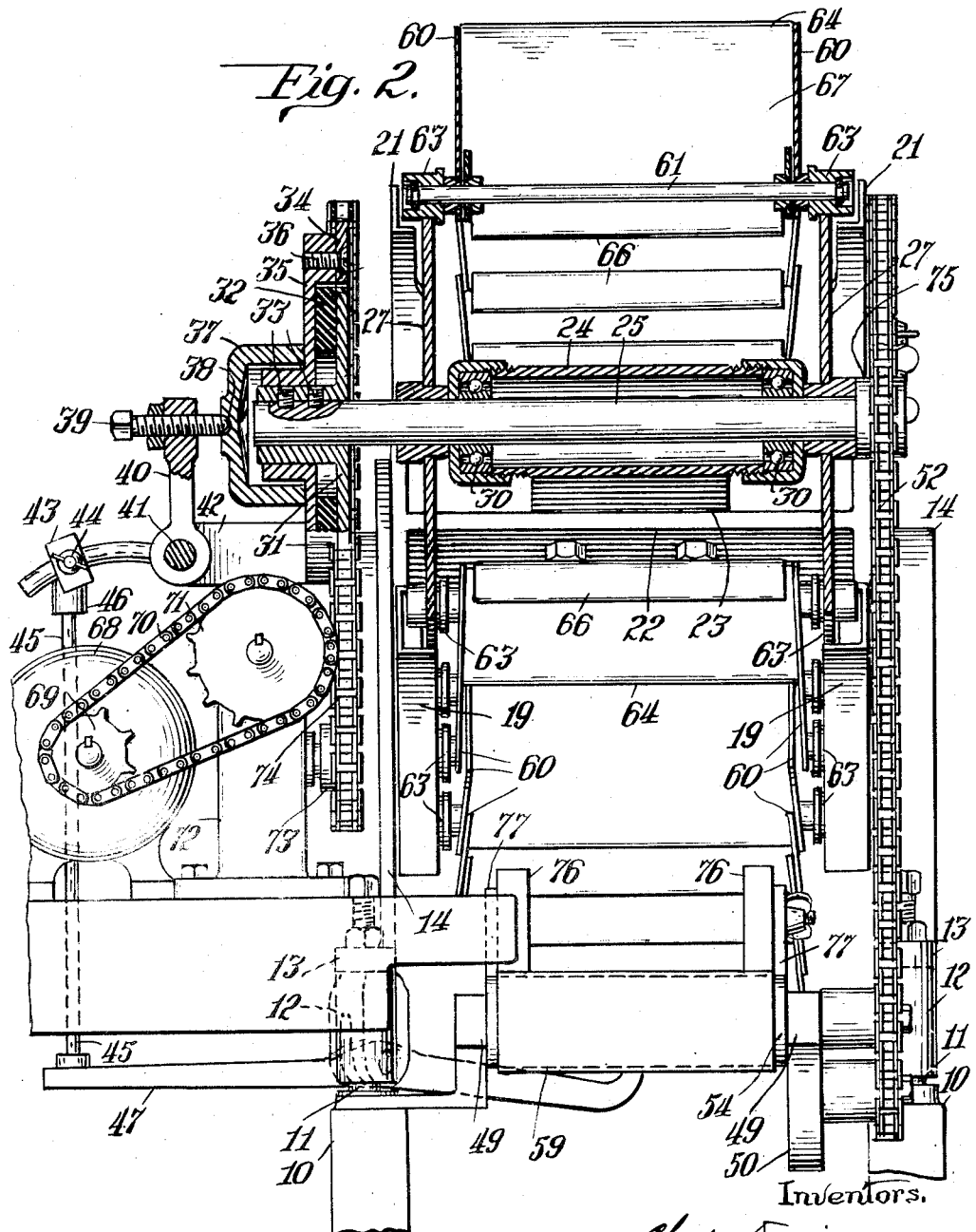
Figure 2 is a sectional elevation taken on the line 2—2 of Figure 1, as viewed by the arrows, a portion of the driving discs being broken away.

The sleeve 24, in Figure 2, is shown sufficiently large to receive ball-bearings 30; and the discs or wheels 27, 27 are immovably secured to the axle 25 so as to rotate therewith.

One end of axle 25 is provided with a disc 31, whose outer face is provided with a fibre covering or disc 32; the hub of the disc 31 being secured to the shaft 25 by set-screws 33 so as to cause the disc 31 to rotate with the shaft; in other words, to induce rotation of shaft 25 when disc 31 is rotated.

Circumferentially disposed about the periphery of disc 31 is a sprocket wheel or ring 34 which is secured to a disc 35 by means of screws 36; the hub of disc 35 being loosely mounted on the hub of disc 31.

The hub of disc 31 extends outwardly beyond the hub of disc 35 and is adapted to receive the cap member 37 which is slidable thereon and whose perimeter bears against the disc 35. The outer face of cap member 37 is provided with a slight depression or axial socket at 38 adapted to receive the end of a set-bolt 39 for the purpose of applying pressure on the cap member 37 and thereby force the disc 35 into frictional relation with the fiber covering or disc 32 which establishes a clutched or frictional driving relation between the sprocket wheel carrying disc 35 and disc 31 which latter is keyed to shaft or journal 25 and which, in turn, is provided with the pair of cutter mechanism controlling wheels or discs 27.

The pressure applying bolt 39 is carried by the upwardly disposed end of an angular lever 40, pivoted at 41 to a suitable extension or arm 42 secured to the upstanding frame 14 on one side of the machine. The other end of the lever 40 extends laterally from the pivotal point and is preferably made arcuate as shown in Figure 2.

This arcuate end of the lever 40 is adapted to slidingly receive a nut or collar 43; the collar 43 being held in its adjusted position on lever 40 by means of a suitable wing screw or bolt 44.

The collar 43 has swiveled connection with the upper end of a link or rod 45, through the medium of a sleeve 46 which is adjustably threaded on rod 45.

The lower end of this rod 45 has operative relation with one end of a horizontally disposed lever 47, which is pivotally supported by the bifurcated bracket 48, so as to tilt vertically; the bracket 48 being secured to the frame member 13, see Figure 1.

The other end of lever 47 extends toward the delivery end of the machine and has an upstanding pin portion arranged in contact with a crossmember of a conveyor carrying frame 49 which is disposed lengthwise of the machine beneath the cutter mechanism. The frame 49 is of rectangular formation and at a distance removed from its other end is tiltably secured to the bottom frame 10.

The frame 49, at one side of the machine and at the receiving end thereof and beyond its tiltable mounting, is provided with a downwardly extending lobe 50 apertured to receive the trunnion or bearing spindle of an idler gear 51 adapted to receive a sprocket chain 52 which also meshes with a gear 53 secured to the trunnion of a roller 54 disposed transversely of the machine with its trunnions journaled in the side members of frame 49.

The other end of frame 49 slidably supports a roller carrying frame 55, whose adjusted position is maintained by means of nuts 56 which screw onto threaded pins extending from the sides of frame 55 through slots 57 in the sides of frame 49 (it being understood that the construction and arrangement of frames 49 and 55 are similar on both sides so far as the slot and pin arrangement just described).

The outer end of the frame 55 has a roller 58 journaled therein.

Disposed about rollers 54 and 58 and extending from one end of the machine to the other is an endless conveyor or belt 59, whereby the product to be cut is conveyed through the machine and beneath the cutter mechanism.

The cutter mechanism consists of a plurality of elements comprising substantially rectangular thin sheet metal side plates 60, 60 of predetermined length.

The corresponding plates 60 at both sides of the cutter mechanism are arranged with their rear ends lapping the forward ends of the next succeeding pair and preferably on the outer sides of the succeeding plates as more clearly shown in Figure 1; and the forward ends of one pair pivotally connected to the forward or preceding pair of plates. The connection between the respective pairs consists of transversely disposed rods 61 which are disposed through ferruled openings in the plates; the openings being adjacent the forward lower corners of one pair and adjacent the lower edge a slight distance forward of the rear ends of the preceding pair of plates; the ferruled openings in the respective plates permitting movement about the control wheels at opposite ends of the machine without imparting turning movement to the rods 61.

The plates of the preceding pair preferably lap the forward ends of the succeeding pair sufficiently to prevent a gap between the succeeding plates when they pass about the control wheels; and in order to obviate the presentation of sharp corners during such movement about the wheels, we prefer to round off the upper rear edges of the plates as shown at 62 in Figure 1.

The ends of the rods 61 extend beyond the outer sides of the plates and these ends are provided with flanged rollers 63, which ride along the guide rails 19 and 21 and also engage in the notches or recesses 29 of the discs or wheels 27, 28 with the flanges of the rollers 63 disposed at the inner faces of the discs or wheels 27, 28.

The corresponding plates 60 of each pair are also united, at a predetermined distance from the forward ends of the plates, by a cross plate 64, secured to the side plates 60 against movement and the upper edge of each plate 64 (as viewed with the cutter elements at the bottom of the endless cutter band, namely while traveling through the cutting zone as shown in Figure 1), is bent slightly rearward relative to the direction of travel, as shown at 65 in Figure 1, for the purpose of receiving a holding clip 66 which consists of a resilient metal strip of U-shape cross-section, substantially of the length of the transverse plates 64.

In order to prevent the material, especially butter, from adhering to the transverse plates 64, we cover the transverse plates 64 with a sheet of parchment or paraffined paper 67 and secure the ends of the paper sheets 67 in place by slipping the U-shaped clips or strips 66 onto the folded ends of the paper sheet and onto the laterally bent edges 65 of the transverse plates 64 as shown at the right in Figure 1.

The transverse plates 64 are spaced a predetermined distance from the forward ends of the side plates and hence a prearranged distance from each other in keeping with the size or length of the cut portions desired; as, for example, the transverse plate 64 of one pair of side plates 60 is spaced from the preceding transverse plate 64 sufficiently to cut a preformed plastic or butter ribbon of a given width and thickness into pound sized bricks or prints.

In the particular exemplification, we disclose a suitable electric motor 68, whose armature shaft has a sprocket 69 provided with a sprocket chain 70 which drives a sprocket wheel 71 of a suitable gear reduction enclosed in housing 72 (and hence not shown) from which extends a shaft on which is secured a sprocket wheel 73, and which in turn drives sprocket chain 74, disposed about the sprocket wheel or sprocket ring 34.

In this construction, the motor or power imparting mechanism is out of positive driving relation with the cutter mechanism driving shaft 25, during initial operation, and the product to be cut is fed onto the endless conveyor or belt 59, causing the latter to freely move therewith until the material approaches the slightly elevated end of the conveyor frame 49 supported by the end of pivoted lever 47, namely the right hand end of the conveyor frame as viewed in Figure 1, when the weight of the material will tilt the frame and induce a positive driven condition of the conveyor.

Our improved machine is intended to be attached to or be arranged at the delivery end of a butter or other plastic material working machine having a delivery throat or orifice from which the material discharges in ribbon form of predetermined width and thickness. The preformed ribbon of material is fed onto the conveyor belt 59, namely at the left hand end of the machine in Figure 1, as shown at B, where the cutter mechanism is elevated sufficiently above the conveyor 59 so as to be out of the path of the material until it approaches the opposite or lever supported end of the conveyor where the downwardly traveling cutter mechanism comes into the path of the material.

In operation, the preformed material or butter B is fed onto the conveyor at the left-hand end of the conveyor as viewed in Figure 1; it being understood that electric current to motor 68 has been turned on. During this initial introduction of the material, the cutter mechanism sprocket 34 is out of operative relation with the driving disc 31 which is secured to shaft 25 and to which the cutter mechanism controlling notched wheels 27, 27 are secured.

The conveyor carrying frame 49—which is tiltably mounted a short distance from its receiving end while the other or delivery end is supported by lever 47—is caused to tilt downwardly at its delivery end by the weight of the material when the latter reaches the cutting zone on the conveyor. The downward tilting of the conveyor frame depresses the free end of pivoted lever 47, causes the other end of lever 47 to tilt upwardly thereby forcing rod 45 upwardly, which in turn rocks lever 40 toward the machine and induces the end of adjustable bolt 39 to exert pressure against the cup member 37, which forces the latter against the loosely mounted disc 35, thereby effecting a frictional driving relation,— through the medium of the fibre 32 disposed intermediate of the flat opposing faces of both discs 35 and 36,—between the sprocket wheel carrying disc 35 and the disc 31 secured to the shaft 25. This operative relation between the discs obtains as long as material is being fed onto the conveyor, with the result that a positive driving of the endless conveyor is provided through the medium of sprocket chain 52 driven by sprocket wheel 75 which is secured to the end of shaft 25; the ratio between sprockets 75 and 53 being such that the conveyor belt 59 will be made to travel at the same speed as the speed of the band of cutter elements.

As the ribbon of material is carried forward by the conveyor belt 59, the transverse plates 64 of the successive downwardly traveling cutter elements 60 will be forced downwardly through the plastic material, cutting the material into prints or blocks of equal length.

At the receiving end of the machine, we prefer to provide a pair of upstanding guide pieces 76, 76, which are secured to upwardly disposed lugs 77 on the conveyor frame 49, as more clearly shown in Figure 1; the guide pieces 76, 76 causing the oncoming material to be properly guided onto the endless conveyor belt 59.

As previously stated, our improved machine is especially intended for use with a suitable machine whereby the plastic material will be continuously fed into the machine and cut into the desired lengths determined by the prearranged cutter mechanism which may be adapted to cut one or more prints; and while the cut portions produced by the particular exemplification will be rectangular in form, it is apparent that the cut portions or prints may have a different configuration and size by changing the shape or contour as well as the spacing of the cutter mechanism forming elements.

Our improved machine is adapted to continuously deliver the cut portions, bricks or prints, when desired, to a wrapping machine, thus providing for a continuous operation of material feeding, cutting and wrapping.

The illustrated exemplification is believed to be the best embodiment of the invention which has been described in terms employed for purposes of description and not as terms of limitation, as structural modifications are possible and may be made without, however, departing from the spirit of our invention as defined in the appended claims.

What we claim is:

1. A machine of the character described comprising a tiltably mounted endless conveyor carrying frame; a plurality of cutter elements linked together into an endless band and arranged to travel through a path disposed lengthwise above the conveyor; spaced apart rotatably mounted wheels for supporting and controlling said cutter band; means intermediate of one of said wheels and the endless conveyor whereby the latter is caused to travel at substantially the same speed as the cutter band; a power driven wheel; clutch mechanism operatively intermediate of one of said first mentioned wheels and the power driven wheel; and means intermediate of the conveyor carrying frame and the clutch mechanism whereby the latter is actuated when said frame is tilted and operative relation between the power driven wheel and one of said cutter band controlling wheels effected.

2. A machine of the character described comprising an endless conveyor; a plurality of cutter elements pivotally secured together in an endless band and arranged to travel through an inclined path above the conveyor; means whereby said cutter band is controlled; means whereby the conveyor and said cutter band are caused to travel at substantially the same speed; power means normally out of operative relation with said first means; and means, operable when the material reaches a predetermined point in its travel, whereby operative relation between the first means and the power means is established.

3. A machine of the character described comprising a plastic material receiving conveyor; an endless cutter band arranged at an inclination above the conveyor with the lower run of the band traveling downwardly toward and in the direction of travel of said conveyor; rotatable means for supporting and driving said cutter band; power means normally out of operative relation with said rotatable means; and means operable by the weight of the material to be cut when the latter approaches the cutting zone whereby operative relation between the power means and said rotatable means is established and the speed of said rotatable means and the conveyor are synchronized.

4. A machine of the character described comprising an extensible, tiltably mounted conveyor belt carrying frame; a plurality of cutter elements pivotally secured together in an endless band and arranged at an inclination above said conveyor; supporting and driving wheels for said band arranged to cause the bottom run of the cutter-band to travel toward the conveyor belt and in the same direction; a power driven wheel; clutch mechanism operatively intermediate of one of said driving wheels and said power driven wheel and normally in declutching condition; and means intermediate of said conveyor frame and said clutch mechanism whereby operative relation between said driving wheel and the power wheel is effected when the belt carrying frame is tilted by the weight of the material carried by the conveyor.

5. A machine of the character described comprising a horizontally disposed conveyor; a plurality of cutter elements of substantially H-shape cross-section with their ends pivotally secured together into an endless band and the pivot-points extended laterally beyond the sides of the band; supporting and driving wheels provided with spaced apart peripheral notches for receiving the extended pivotal points; driving mechanism normally out of operative relation with one of said driving wheels; and means whereby operative relation between the driving mechanism and said driving wheel is established when the material to be cut reaches a prearranged point on the conveyor.

6. A machine of the character described comprising a material conveying conveyor; a plurality of cutter elements pivotally connected together in a continuous band and arranged at an inclination relative to the conveyor with the lower run of the elements traveling downwardly toward and in the direction of travel of the conveyor; rotatably mounted wheels for controlling said band; a power driven member associated with one of said wheels and adapted to effect operative relation therewith; and means, operatively intermediate of the conveyor and said power driven member, whereby the operative relation between said member and said wheel is produced when the material to be cut reaches a predetermined place on the conveyor.

7. A machine of the character described comprising a defined path of travel for the material to be cut; a continuous band of cutter elements arranged at an inclination so as to move downwardly into cutting position; rotatable means for controlling said band; a power driven member associated with a part of said rotatable means and adapted to move into operative relation therewith; and means adapted to be controlled by the material when the latter has traveled a prearranged distance along said path whereby the operative relation is established.

8. In a machine of the character described, cutter elements composed of spaced apart side plates and transverse plates connected to the side plates at a predetermined distance from the ends of the side plates for determining the length of the cut material or prints; the ends of the succeeding side plates being pivotally secured together to provide a continuous cutter band; drive wheels for moving said band; power means normally out of operative relation with said drive wheels; and means arranged along the path of the material to be cut whereby operative relation between the drive wheels and the power means is established when the material approaches the cutting zone.

9. In a machine of the character described, cutter mechanism composed of a plurality of corresponding side plates arranged in pairs with the side plates of the successive pairs pivotally secured together into a continuous band and each pair provided with a transversely arranged cutter plate or blade secured at its ends to the respective pair of side plates, the pivots of the cutter mechanism extending beyond the sides of the side plates; notched drive wheel for receiving the extended pivots; driving mechanism normally out of driving relation with said drive wheels; and means adapted to be effected by the material to be cut when the latter approaches the cutting zone, whereby a driving relation between the driving mechanism and said drive wheels is provided.

10. In a machine of the character described, a material receiving path-way adapted to guide the material through the machine; a plurality of cutter elements provided with side plates, the side plates of adjacent cutter elements being pivotally connected together into an endless band above said path-way, the pivoted ends of said side plates having laterally disposed rollers; notched drive wheels adapted to receive said rollers and to impart movement to the endless band; power mechanism normally out of driving relation with said drive wheels; and means disposed along the pathway of the material to be cut whereby the driving relation between the power mechanism and said drive wheels is established when the material approaches the cutting zone.

11. A cutter machine of the character described comprising a tiltably mounted frame provided with an endless material receiving conveyor; cutter mechanism disposed above said conveyor and composed of a plurality of cutter elements adapted to travel in a direction lengthwise above the conveyor; power mechanism adapted to actuate said cutter mechanism; means operatively intermediate of said conveyor frame and said power mechanism whereby operative relation between the power mechanism and the cutter mechanism is established when the material to be cut approaches the cutting zone; and means operatively intermediate of the cutter mechanism and the conveyor whereby the latter is made to travel at a speed correlated to the speed of movement of the cutter mechanism when said operative relation between the latter and the power mechanism is established.

12. A cutter machine of the character described comprising an endless material receiving conveyor; an endless band of cutter elements arranged above the conveyor; control wheels at opposite ends of the band; power mechanism normally out of driving relation with the control wheel at one end of said band of cutter elements; and means operatively intermediate of said last mentioned control wheel and said power mechanism adapted to establish the driving relation with said control wheel when the material to be cut has traveled a predetermined distance on the conveyor.

13. A cutting machine of the character described comprising an endless material receiving conveyor; an endless band of cutter elements arranged above the conveyor; control wheels at opposite ends of the band; power mechanism normally out of driving relation with the control wheel at one end of said band of cutter elements; means intermediate of the power mechanism and said control wheel for frictionally establishing driving relation therebetween; and tilting mechanism affected by the weight of the material when the latter reaches a predetermined point in its travel through the machine whereby said last mentioned means is actuated.

14. A cutting machine of the character described comprising a tiltably mounted material conveyor; an endless band of cutter elements arranged above the conveyor; means for operating said band; power mechanism for operating said means and involving a rotatable driving member adapted to be shifted into driving relation with said means; and lever mechanism intermediate of the tiltably mounted conveyor and said driving member adapted to hold the latter in driving relation with said means when the conveyor is tilted by the material passing through the cutting zone.

15. A cutting machine of the character described comprising a tiltably mounted material conveyor; an endless band of cutter elements arranged above the conveyor; means for operating said band involving a rotatable shaft with a disc secured thereto; a drive wheel loosely mounted adjacent said disc; levers adjustably connected together and arranged intermediate of the tiltably mounted conveyor and said drive wheel whereby the latter is forced into driving relation with said disc when the conveyor is tilted by the material approaching the cutting zone.

16. A machine of the character described comprising an endless conveyor; a plurality of cutter elements pivotally secured together in an endless band and arranged to travel at an inclination above the conveyor with the lower run of the band traveling downwardly toward and in the direction of movement of the conveyor; power means; means adapted to effect operative relation between said power means and said band; and means operable by the material to be cut when the latter approaches the cutting zone whereby the second mentioned means are actuated and the operative relation between the power means and the second mentioned means is effected.

CHARLES DOERING.
HENRY H. DOERING.
ERIC W. ANDERSON.
BERTIL SKOGLUND.